July 5, 1949.  J. W. YORK  2,474,926
AXIALLY SHIFTING TYPE LEVER OPERATED TIRE REMOVER
Filed May 14, 1945

INVENTOR.
John W. York
BY
Fishburn & Mullendore
ATTORNEYS.

Patented July 5, 1949

2,474,926

UNITED STATES PATENT OFFICE 2,474,926

AXIALLY SHIFTING TYPE LEVER OPERATED TIRE REMOVER

John W. York, Falls City, Nebr.

Application May 14, 1945, Serial No. 593,582

2 Claims. (Cl. 157—1.26)

This invention relates to tools for removing tires from wheels, and more particularly to a device of that character adapted for removing the tires from tractor or truck wheels.

Tires which have been on the rim of a wheel for some time will adhere to the rim to such an extent that it is very difficult to release the tire from the rim with ordinary tools now available. The rims of the wheels are usually made from steel and there is a tendency for the flanges and adjacent metal to rust and thus form a bond between the tire bead and the rim.

The present invention is adaptable for removing tires from what is commonly known as "drop-center" rims on which pneumatic tires are used, or is adaptable for other tires, such as solid rubber tires, also having a bead engaging the rim of the wheel. In using the device on pneumatic tires, the rusting of the metal forms a bond which must be broken before the tire can be removed from the rim. Care should be exercised to protect the tire and tube from injury.

The principal objects of the present invention are to provide a tool for engaging the tire at the juncture with the rim to which the tire is attached and on which downward force may be exerted to break the bond between the tire and rim; to provide a device for holding the tire with relation to the tool for removing the tire from the rim so that the bond between the tire and rim may be broken; to provide a device which will have direct leverage contact with the tire adjacent the rim for exerting force on the tire to break the bond therebetween; to provide a device which may be adjustable to fit tires of different size; to provide a device adjustable for removing various size tires from rims and providing the desired leverage for tires of greater size; and to provide a simple, economical and efficient tool for this purpose which may be used for the purpose set forth.

In accomplishing these and other objects of the invention, I have provided improved structure, the preferred form of which is illustrated in the accompanying drawings, wherein.

Figure 1:
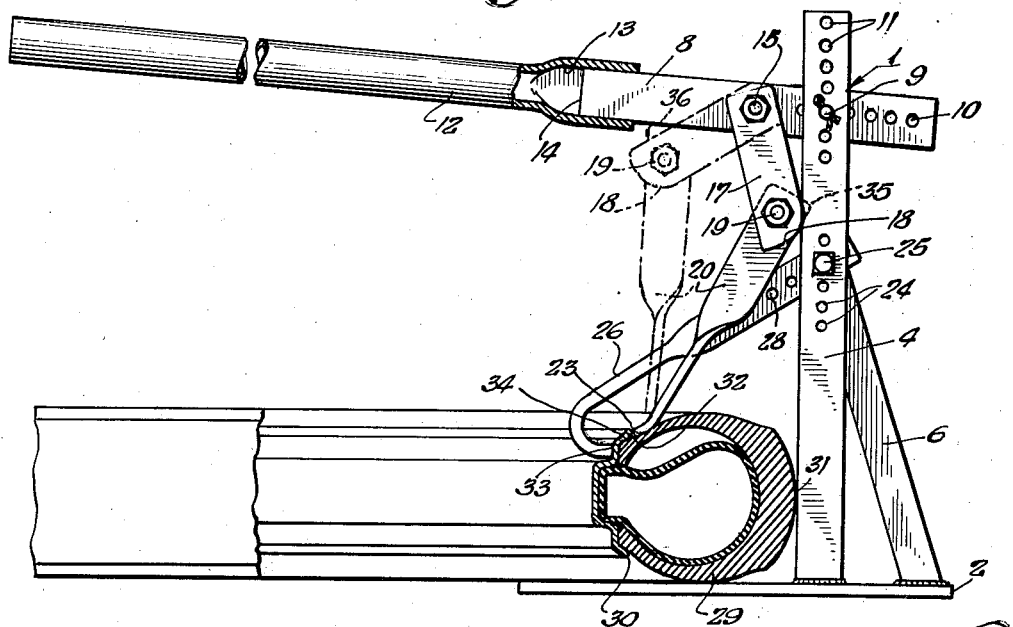
Fig. 1 is a side view of a tool embodying my invention, showing a tire in cross-section with a tool engaging therewith, and a modified form of the leverage mechanism being shown in dotted lines.
Figure 2:
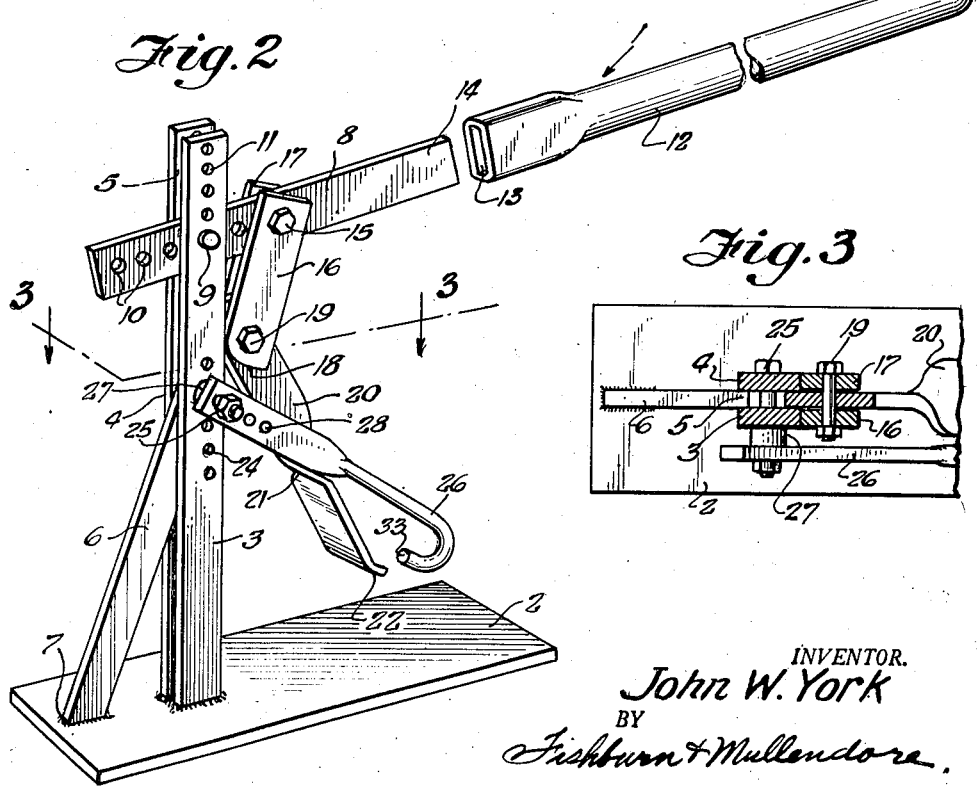
Fig. 2 is a perspective view of the invention with the handle being shown in disassembled relation.
Figure 3:
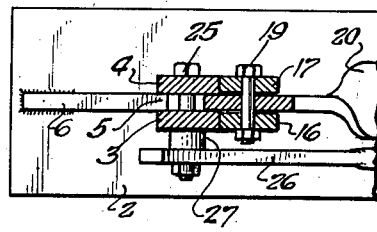
Fig. 3 is a cross-sectional plan view taken on a line 3—3, Fig. 2.

Referring more in detail to the drawings:

I designates a tool for removing tires embodying the features of my invention, comprising a base plate 2, uprights 3 and 4 rigidly secured to the base plate by welding or other suitable means, and spaced apart to provide a channel 5 therebetween. A brace 6 is rigidly secured to the rear of the base plate by welding or other suitable means, as indicated at 7, having its upper end secured at substantially the center of the uprights by brazing, welding or other suitable means.

The lever arm 8 is pivotally secured between the uprights 3 and 4 at substantially the upper end of the uprights by a pin 9 through suitable bore openings 10 in the arm and in the uprights, as indicated at 11. A plurality of openings 10 and 11 may be provided in the arm and uprights so that the arm may be adjustable with respect to the standard to adapt the device for different size tires, the larger tires requiring the lever arm to be raised to the upper openings in the uprights and for greater leverage, the arm is lengthened by inserting the pin 9 through the rear opening in the lever arm. A handle 12 having a bore opening 13 is provided to fit over the end 14 of the lever to provide greater leverage to the arm 8.

Pivotally secured to the arm 8 by a bolt or the like 15 are links 16 and 17 having their lower ends rounded, as at 18, and adapted to receive and be pivotally secured to the lower ends by a bolt 19 is a bar 20 twisted, as indicated at 21, to provide a flat lower end with the extreme outer part bent slightly, as indicated at 22, to engage between the bead of a tire and the rim, as indicated at 23, Fig. 1, when the device is in position to be operated.

The uprights 3 and 4 are provided with a plurality of openings 24 adapted to receive a bolt or the like 25 for pivotally mounting a hook 26 on the outer side of the uprights 3 and 4. The hook 26 is spaced from the uprights by a bushing 27. The inner end of the hook is provided with bore openings 28 for adjusting the length of the hook with respect to the tire being removed.

In Fig. 1 is shown a tire 29 lying on the base 2 attached to a rim 30 of a wheel (not shown).

Operation of a device assembled and constructed as described is as follows:

The tire to be removed from the rim is placed on the base plate 2 with its lower surface contacting the uprights, as indicated at 31, Fig. 1. The end 22 of the bar 20 is placed so that it will contact the bead 32 of the tire between the bead and the rim 30. The end 33 of the hook engages the shoulder 34 of the rim of the tire to hold the tire against the uprights 3 and 4. Downward force on the handle 12 will cause the links 16 and 17 to push the bar 20 downwardly at an inward angle against the uprights so that the rounded ends 18 of the bar ride against said uprights and the upper end 35 of the arm will engage in the channel 5 between the uprights, thus exerting an outward force on the bar so that its outer end 22 will tend to be inserted between the bead 32 of the tire and the rim 30 of the wheel to break the bond therebetween. After the bond has been broken, the links and arm may be pulled outwardly and placed into a position such as shown in dotted lines in Fig. 1, so that the upper end 35 of the bar contacts the lever arm 8, as indicated at 36. Continued downward pressure on the bar in this position will further release the tire from the rim. The tool may then be released at this first point of contact and the tire moved to a new point of contact for further breaking of the bond between the bead on the tire and the rim of the wheel.

It will be obvious from the foregoing that I have provided an improved tool for removing tires from the rims of wheels and which with light force may be applied between the bead on the tire and the rim to break the bond therebetween, and which tool is adjustable to fit tires of different size.

What I claim and desire to secure by Letters Patent is:

1. A device for removing tires from rims of wheels comprising, a base, a vertical standard secured to said base, said standard having a bifurcated upper end, a hook adjustably and pivotally attached to one side of said standard for holding the tire against said standard, a lever pivotally connected in said bifurcated end of the standard, links pivotally connected to said lever, and an arm pivotally connected between the lower ends of said links, the inner lower edges of said links being slightly rounded for engaging the edges of the bifurcated standard to exert a downward and outward force on the arm upon downward movement of the lever to press the lower end of the arm between the bead of the tire and the rim of the wheel.

2. A device for removing tires from rims of wheels comprising, a base, a vertical standard secured to said base, said standard having a bifurcated upper end, a hook adjustably and pivotably attached to one side of said standard for holding the tire against said standard, a lever adjustably and pivotally mounted in the bifurcated end of the standard, links pivotally connected to said lever, and an arm pivotally connected between the lower ends of said links and in vertical alignment with said lever, the lower ends of said links being rounded for engagement with said standard to give a downward and forward movement to said arm to press the lower end of the arm between the bead on the tire and the rim of the wheel.

JOHN W. YORK.

REFERENCES CITED

The following references are of record in the file of this patent:

UNITED STATES PATENTS

| Number | Name | Date |
|---|---|---|
| D. 138,773 | Graves et al. | Sept. 12, 1944 |
| 1,208,184 | Mayer | Dec. 12, 1916 |
| 1,447,113 | Woodhall | Feb. 27, 1923 |
| 1,486,030 | Pence | Mar. 4, 1924 |
| 1,495,884 | Chapman | May 27, 1924 |
| 1,567,276 | Kowalzcyk et al. | Dec. 29, 1925 |
| 1,591,193 | Weaver | July 6, 1926 |
| 1,858,098 | Linde | May 10, 1932 |